United States Patent [19]
Steiger

[11] Patent Number: 4,834,055
[45] Date of Patent: May 30, 1989

[54] FUEL INJECTION SYSTEM

[75] Inventor: Anton Steiger, Illnau, Switzerland

[73] Assignee: Sulzer Brothers Limited, Winterthur, Switzerland

[21] Appl. No.: 160,854

[22] Filed: Feb. 26, 1988

[30] Foreign Application Priority Data

Mar. 17, 1987 [CH] Switzerland ............... 01014/87

[51] Int. Cl.⁴ ............................................. F02M 39/00
[52] U.S. Cl. ................................. 123/575; 123/23; 123/447; 123/300
[58] Field of Search ............ 123/299, 300, 585, 506, 123/447, 586–587, 23

[56] References Cited

U.S. PATENT DOCUMENTS

| | | | |
|---|---|---|---|
| 4,520,774 | 6/1985 | Sitter | 123/300 |
| 4,590,903 | 5/1986 | Hofmann | 123/575 |
| 4,590,904 | 5/1986 | Wannenwetsch | 123/575 |
| 4,612,905 | 9/1986 | Deitrich | 123/575 |
| 4,662,315 | 5/1987 | Sommer | 123/23 |
| 4,674,448 | 6/1987 | Steiger | 123/23 |
| 4,693,227 | 9/1987 | Satou | 123/575 |
| 4,705,010 | 10/1987 | Barnesca | 123/575 |
| 4,711,209 | 12/1987 | Henkel | 123/300 |

*Primary Examiner*—Carl Stuart Miller
*Attorney, Agent, or Firm*—Kenyon & Kenyon

[57] ABSTRACT

The injection fuel system employs a hydraulically operated piston for pressurizing and expelling a primary fuel suspension through an injection valve into the combustion chamber. A high pressure piston pump which is driven off the camshaft delivers diesel oil to operate the piston. In addition, the high pressure piston pump provides pressurized diesel oil to open and close the injection valve for the primary fuel during an injection phase and also supplies pressurized diesel oil to operate the injection valve for the ignition oil. The hydraulically operated piston can be adjusted in dependence upon the speed of the engine with a corresponding adjustment in the pressure used to regulate the injection valve for the ignition oil.

21 Claims, 3 Drawing Sheets

FUEL INJECTION SYSTEM

This invention relates to a fuel injection system. More particularly, this invention relates to a fuel injection system for a combustion chamber of a reciprocating internal combustion engine. Still more particularly, this invention relates to a fuel injection system for injecting diesel oil as an ignition oil and for injecting a separate primary fuel.

As is known, various types of fuel injection systems have been known for the injection of fuel into a combustion chamber of an internal combustion engine. In some cases, the fuel injection systems have been provided with injection valves for injecting a primary fuel consisting of a suspension of finely divided solid fuel particles in a liquid or in a diesel or heavy oil. For example, the primary fuel may comprise petroleum coke or coal which is ground to very fine particles between 5 and 20 $\mu$m and which is suspended in water or oil or both. In addition, it has been known to provide such systems with injection valves for the injection of an ignition oil such as diesel oil into the combustion chamber. Generally, the injection valve for the ignition oil has had at least one spray opening which is controlled by a valve needle and which communicates with an accumulator chamber for receiving the diesel oil at an injection pressure at least equal to the injection pressure of the primary fuel.

Hitherto the suspension, also known as coal slurry, has been injected by "accumulation injection" (alternatively termed time-dependent injection), whereas the ignition oil has been injected both on the positive displacement principle and by time-dependent injection. The latter method of injection has distinct advantages over the classic positive displacement principle, viz. a very precisely controlled injection characteristic as regards the pressure/time diagram, permitting a substantially rectangular form. Not only the moment of injection, but also the duration of injection can be precisely determined. In addition, the duration of injection can be limited to fractions of milliseconds, which is particularly useful for ignition oil injection.

The injection of coal slurry using an accumulator has proven to have the disadvantage that the slurry hardens in the accumulator during intervals in the operation of the reciprocating engine or after a change from operation with coal slurry to operation with diesel oil or heavy oil as the primary fuel. Further, it is practically impossible to clean an accumulator filled with hardened coal slurry by flushing the accumulator with diesel or heavy oil. It has been found that the diesel or heavy oil flushes clear only a narrow passage through the hardened coal slurry, and not enough to permit further normal operation of the engine.

Accordingly, it is an object of the invention to provide an improved fuel injection system in which a coal slurry does not harden during intervals in operation or after a switch of primary fuel to diesel or heavy oil.

It is another object of the invention to improve the operation of a fuel injection system.

It is another object of the invention to avoid hardening of a primary fuel suspension within a fuel injection system.

Briefly, the invention provides a fuel injection system for a combustion chamber of a reciprocating internal combustion engine which is capable of injecting a primary fuel and an ignition oil into the combustion chamber.

The fuel injection system includes an injection valve for injecting the primary fuel which is constructed and operated on a positive displacement principle. To this end, the injection valve has a plurality of spray openings for injecting a primary fuel containing a suspension of solid fuel particles into the combustion chamber, a valve seat and a valve needle seated on the valve seat and movable therefrom during an injection phase in order to control flow through the spray openings. Further, a supply duct communicates with the injection valve for delivering the primary fuel and a cylinder is disposed in the supply duct in order to receive the primary fuel. Still further, a hydraulically operated piston is disposed in the cylinder for pressurizing and expelling the primary fuel from the cylinder into the injection valve for injection through the spray openings during an injection phase when the valve needle is lifted from the valve seat.

The use of an injection valve which is constructed and operates on the positive displacement principle eliminates the need for an accumulator. Hence, hardening of the primary fuel, for example a coal slurry, during intervals in the operation of the engine is eliminated.

Further, by using a hydraulically operated piston, problem-free injection of the coal slurry is possible. That is, there is no risk of the piston jamming due to coal particles penetrating into a gap between the cylinder and piston. This is because the pressure of an operating diesel oil on the piston can be somewhat greater than the pressure in the primary fuel to be injected. Because of this pressure difference, the diesel oil tends to flow along the piston from the driven side to the cylinder chamber containing the primary fuel.

The arrangement of the hydraulically operated piston also allows the cylinder and the injection valve for the primary fuel to be disposed close together so as to form a "jet pump". With this arrangement, the effect of the compression volume between the piston and the valve needle, normally a disadvantage of positive displacement, is practically neglible. Another advantage of the arrangement is that the customary need for a pressure regulating valve between the piston and the injection valve is eliminated since the function of the pressure regulating valve is fulfilled by the valve needle.

A fuel injection system also includes a second injection valve having at least one spray opening for injecting an ignition oil such as diesel oil into the combustion chamber as well as a valve needle for controlling flow through the spray opening. In addition, an accumulator chamber is provided to receive ignition oil at an injection pressure at least equal to the injection pressure of the primary fuel. This accumulator chamber is placed in communication with this second injection valve for delivering the injection oil thereto.

The fuel injection system also has a high pressure piston pump which can be driven by a cam shaft of the engine and which serves to deliver pressurized diesel oil to the piston of the hydraulically operated piston as well as to the accumulator chamber for the ignition oil. A branch duct may also be provided to deliver pressurized oil to an end of the valve needle of the injection valve for the ignition oil in order to bias the valve needle into a closed position relative to the spray opening between the injection phases of the injection valve for the primary fuel.

An overflow duct may also be connected to the accumulator with a regulating valve in the duct in order to determine the pressure of oil in the accumulator. The regulating valve may, in turn, be adjustable in dependence on an adjustment in the stroke of the hydraulically operated piston for the primary fuel injection valve.

These and other objects and advantages of the invention will become more apparent from the following detailed description taken in conjunction with the accompanying drawings wherein.

Figure 1:
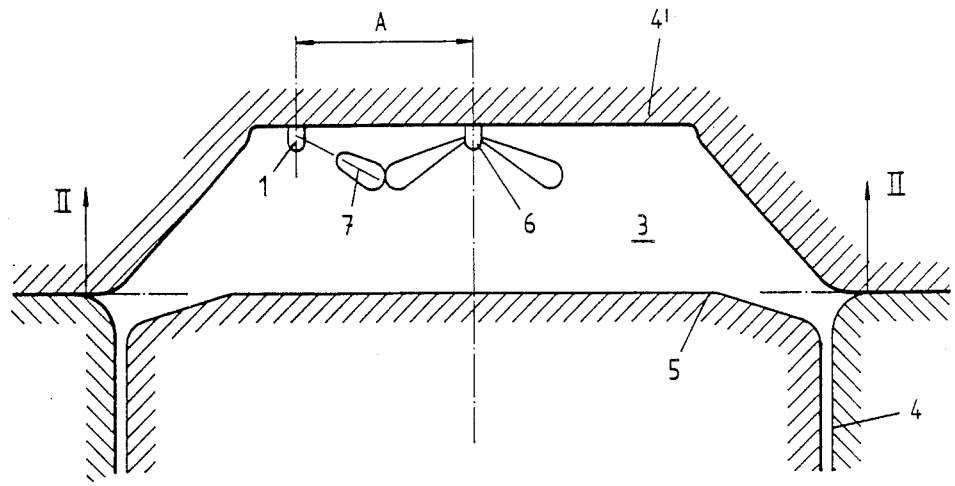
FIG. 1 illustrates a diagrammatic view of a combustion chamber of a reciprocating internal combustion engine having injection valves for primary fuel and ignition oil.
Figure 2:
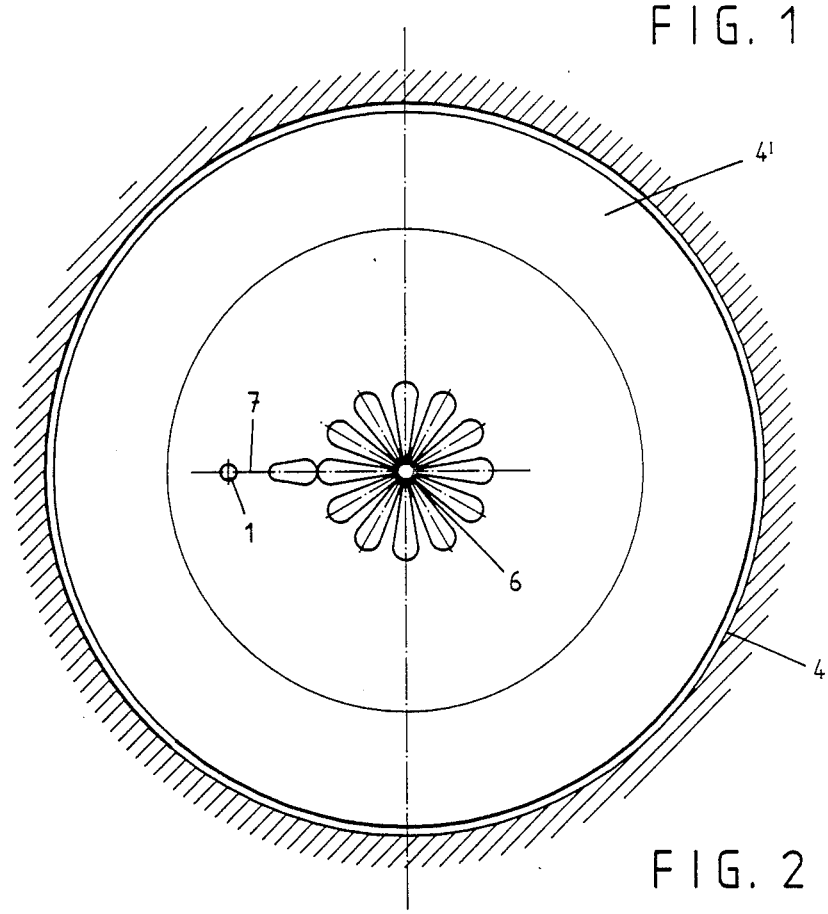
FIG. 2 illustrates a view taken on line II—II of FIG. 1.

Referring to FIGS. 1 and 2, the combustion chamber 3 which is one of several of a reciprocating internal combustion engine of the diesel type, is defined essentially by a cylinder head 4' and by a working piston 5. The piston 5 is movable up and down, as viewed, in a cylinder 4 and is shown in a top dead center position in FIG. 1. An injection valve 6 for primary fuel projects from the cylinder head 4' into the combustion chamber 3 at the center while a second injection valve 1 projects at a lateral distance A into the chamber 3 to inject ignition oil for igniting the primary fuel. As indicated in FIG. 2, the injection valve 6 for the primary fuel has a plurality of spray openings, for example, twelve which are equally spaced around the axis of the valve. The injection valve 1 for the ignition oil has one spray opening disposed on an axis 7 and directed towards the injection valve for the primary fuel. The number of spray openings in the injection valve 1 may vary between one and three with the axis of any further opening being directed towards the injection valve 6.

Figures 3, 3A:
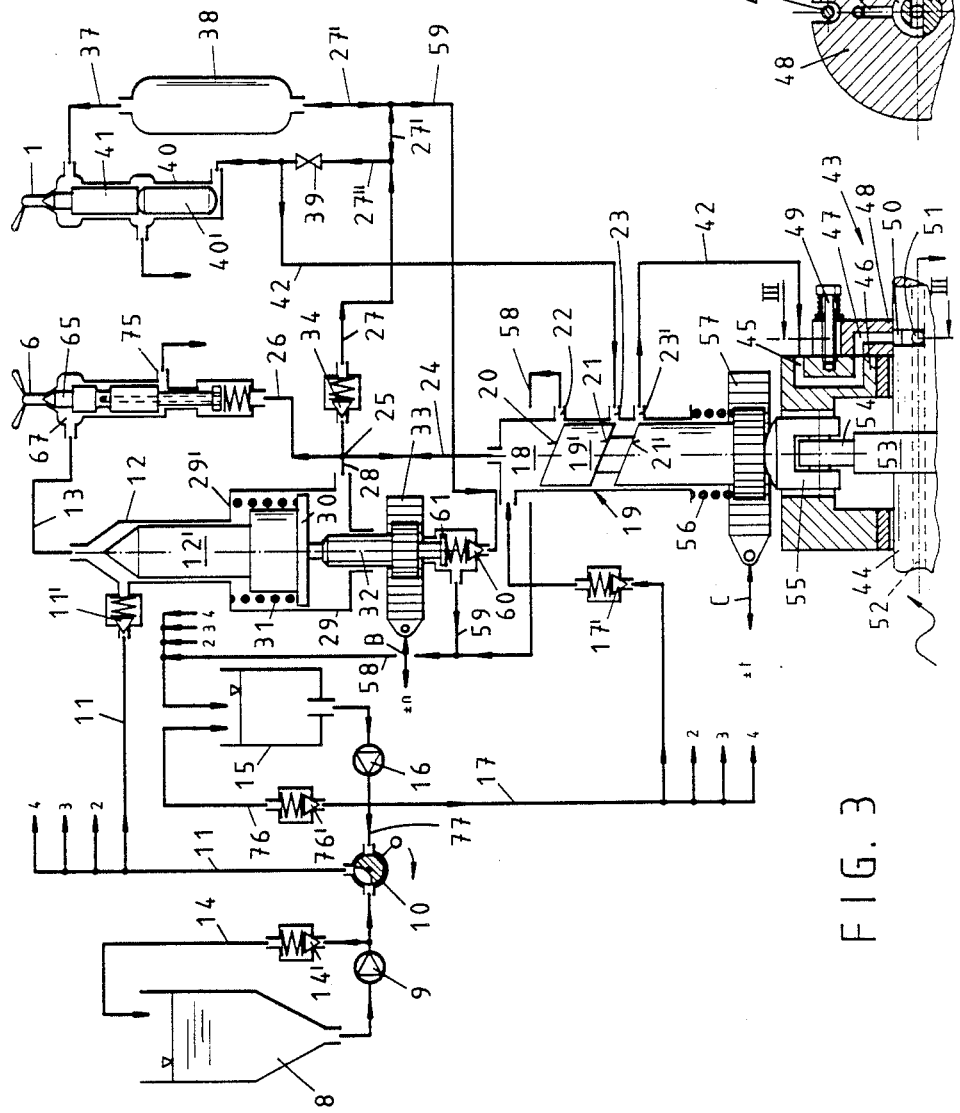
FIG. 3 illustrates a diagrammatic view of a fuel injection system constructed in accordance with the invention.
FIG. 3a illustrates a sectional view taken on line III—III of FIG. 3.

Referring to FIG. 3, the fuel injection system has a supply reservoir 8 for primary fuel, for example, a coal slurry, which is connected to a slurry pump 9. The pump 9, in turn, delivers the primary fuel by way of a three-way valve 10 and a supply duct 11 into a cylinder 12 as well as into a supply duct 13 leading to the injection valve 6 for primary fuel. A hydraulically operated piston 12' is also reciprocally mounted in the cylinder for pressurizing and expelling the primary fuel from the cylinder 12 in the injection valve 6. A suction valve 11' is also provided at the fuel inlet to the cylinder 12 to prevent a backflow of primary fuel in the supply duct 11.

As indicated in FIG. 3, the supply duct 13 is very short in order to minimize the volume of fuel enclosed. In addition, an overflow duct 14 is provided between the pump 9 and the three-way valve 10 along with a pressure control valve 14' for a return flow of coal slurry to the supply reservoir 8.

The fuel injection system also includes a supply reservoir 15 for diesel oil. This reservoir 15 is connected to a diesel oil pump 16 which feeds the oil through a duct 17 and suction valve 17' to a cylinder chamber 18 of a high pressure pump. This pump 19 has a piston 19' which is movable up and down, as viewed and which has an oblique control edge 20 on an end face facing the chamber 18 and a control groove in a central portion of the piston 19. This control groove is defined by an upper control edge 21 and a parallel lower control edge 21'. The edge 20 cooperates with an upper control aperture 22 in the cylinder wall of the pump 19 whereas the edges 21, 21' cooperate with a central control aperture 23 and lower control aperture 23' in the cylinder wall.

A duct 24 leads from the chamber 18 of the pump 19 to a branch point 25 from which a duct 26 leads to the injection valve 6. In addition, a second duct 27 extends to the injection valve 1 for the ignition oil and a third duct 28 extends to an operating cylinder 29 for the piston 12'. Thus, the diesel oil is used to drive the piston 12' hydraulically while also serving to close the injection valve 6 and to operate the injection valve 1 as further described below.

By means of the hydraulically operated piston 12', the two media (primary fuel and diesel oil) are separated from one another. Further, the pressure of the diesel oil is always maintained somewhat higher than that of the primary fuel so that no coal particles can settle in the gap between the piston 12' and the surrounding wall of the cylinder 12. As indicated, the driven side of the piston 12, forms a disk 30 which is connected to the piston. This disk 30 is subjected from below to the pressure of the diesel oil and from above to the force exerted by a return spring 31 housed in the cylinder 29. The upward stroke of the piston 12' is limited by a stop 29' at a transition from the cylinder 29 to the cylinder 12. The downward stroke of the piston 12' is limited by an adjustable stop screw 32 which projects in the operating cylinder 29 from below. The head of the stop screw 32 is in the form of a pinion which meshes with a rack 33 which is adjustable according to the speed (n) of the reciprocating engine as indicated by a double arrow B so that the extent to which the screw 32 extends into the operating cylinder 29 and, hence the stroke of the piston 12'are variable. The duct 27 which communicates with the injection valve 1 contains a non-return valve 34 and branches into two branch duct 27', 27''. The first branch duct 27' leads to an accumulator 38 in which ignition oil for injection is stored at injection pressure and which is connected by a duct 37 to the injection valve 1. The second branch duct 27'' contains a fixed throttle 39 and leads to a 19 cylinder 40 containing a loading piston 40' for a valve needle 41 of the injection valve 1. A control duct 42 branches off from the duct 27'' between the cylinder 40 and the fixed throttle 39 and extends to the central control aperture 23 of the high-pressure pump 19. Starting from the lower control aperture 23' of this pump, the control duct 42 continues to a rotary valve 43, which is situated on a camshaft 44 for driving the piston 19' of the high-pressure pump 19. The control duct 42 leading to the rotary valve 43 ends in a U-shaped duct 45 formed in a bearing block 46 for the camshaft 44. The other end of this U-shaped duct 45 communicates with an angled duct 47, formed in a disc 48 mounted on the camshaft 44 and attached by a screw 49 to the bearing block 46. In the region of the outlet from the angled duct 47, there is a groove 50 in the camshaft 44, extending approximately halfway round the camshaft and leading at the ends into a transverse bore 51 in the camshaft 44. This bore 51 communicates with a discharge bore 52 extending along the center of the camshaft. When the camshaft is in the position shown in FIGS. 3 and 3a, therefore, the U-shaped duct 45 and angled duct 47 communicate by way of the groove 50 and transverse bore 51 with the discharge bore 52, whereas when the camshaft is turned through 180°, the groove 50 is away from the mouth of the angled duct 47, and diesel oil in this duct 47 cannot reach the discharge bore 52.

The camshaft 44 serves also to drive the piston 19, of the high pressure pump 19. To this end, a cam 53 is provided, on which is supported, by way of a roller 54, a ram 55 which is guided in the bearing block 46, and onto whose top the piston 19′ is biased by a compression spring 56. The lower end of the piston 19′ as viewed is in the form of a pinion meshing with a rack 57, which is movable in the direction of a double arrow C and determines the time (t) for injection. An overflow duct 58 connected to the upper control aperture 22 of the high pressure pump leads back to the supply reservoir 15 for diesel oil.

The high-pressure pump 19 begins to feed diesel oil to the duct 24 when, during the upward stroke of the piston 19′, the control edge 20 has completely covered the upper control aperture 22. During the downward stroke of the piston 19′, diesel oil flows out of the duct 17 by way of a the suction valve 17′ to replenish the cylinder chamber 18 of the pump.

From the branch duct 27′ of the ignition oil injection system, a discharge duct 59 branches off downstream of the non-return valve 34 and leads by way of a valve 60 regulating the discharge pressure into the overflow duct 58 leading to the discharge reservoir 15. The discharge pressure controlled by the regulating valve 60, which is also the pressure in the accumulator 38, can be varied by changing the spring tension in the valve 60. This is done by adjusting the spring abutment 61, of which the upper end in FIG. 3 bears on the lower end face of the stop screw 32. Any adjustment of the screw 32 therefore also changes the spring tension in the valve 60.

Figure 4:
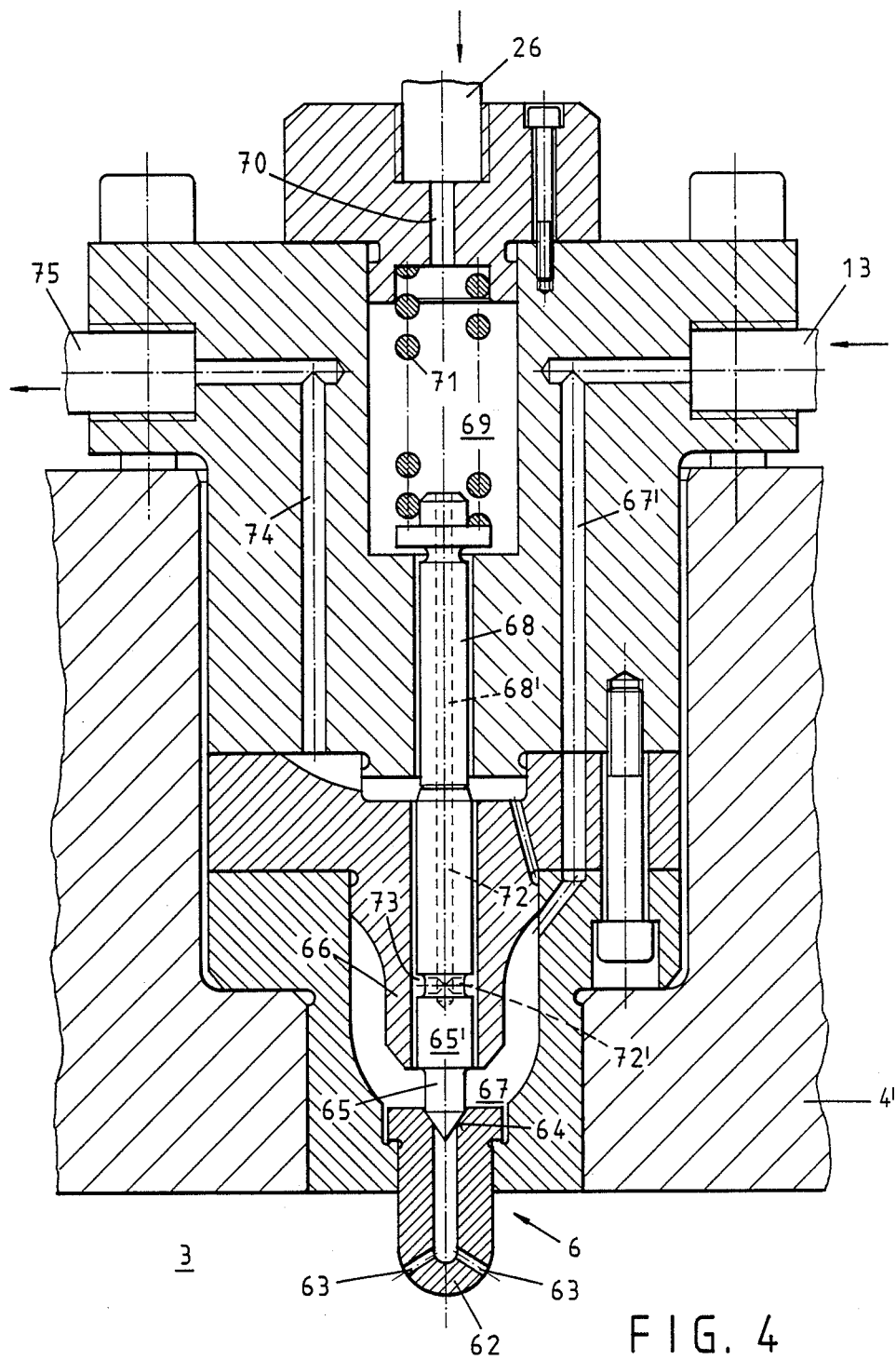
FIG. 4 illustrates an axial sectional view through an injection valve for the primary fuel in accordance with the invention.

Referring to FIG. 4, the injection valve 6 for primary fuel, situated in the cylinder head 4′, has nozzle head 62 containing a plurality of spray openings 63 directed into the combustion chamber 3. The upper end of the nozzle head 62, as viewed, has a conical seat 64 for a valve needle 65, of which the stem 65′ is mounted in a guide 66. A space 67 about the needle 65 between the nozzle head 62 and guide 66 is filled with primary fuel for injection, which is supplied along the duct 13 and a communicating duct 67′.

A plunger 68 is disposed above and coaxial with the stem 65′ as viewed. This plunger 68 is smaller in diameter than the stem 65′ and has an upper end which extends into a pressure chamber 69. The pressure chamber 69, in turn, communicates via a duct 70 with the duct 26 for supplying high-pressure diesel oil as a pressure medium from the high-pressure pump 19 (see FIG. 3). This pressure medium therefore acts by way of the plunger 68 to bias the valve needle 65 into a seated position on the valve seat 64 to close the valve 6. The closing pressure is supplemented by a compression spring 71 housed in the pressure chamber 69 and bearing on a shoulder on the plunger 68.

The plunger 68 contains an axial bore 68′ which continues through part of the stem 65′ as a blind axial bore 72. The bottom end of the blind bore 72 communicates by way of a transverse bore 72′ with an annular groove 73 in the stem. Diesel oil at high pressure flows along the bores 68′, 72 and 72′ into the annular groove 73, from which some of the oil passes as sealing oil along the gap between the valve stem 65′ and guide 66 to the chamber 67 filled with primary fuel, thus preventing fine coal particles from the primary fuel from penetrating into this gap. Such penetration by solid particles might lead to jamming of the valve needle 65. Other diesel oil from the annular groove 73, moreover, flows upwards along the gap between the upper portion of the stem 65′ and the guide 66 and then by way of a leakage duct 74 to a communicating discharge duct 75.

Referring to FIG. 3, an overflow duct 76, analogous to the overflow duct 14 and having a pressure control valve 76′, is connected downstream of the diesel oil pump 16. Between the duct 17 from the diesel oil pump and the three-way valve 10, moreover, there is a duct 77, which is blocked when the valve 10 is in the position shown in FIG. 3.

Arrows 2, 3, 4 associated with the ducts 11 and 17 in FIG. 3 are intended to indicate that parallel ducts may branch off these ducts and lead to further cylinders 4 (FIG. 1) of the reciprocating engine, each of which has another injection system of the type described.

The injection system described operates as follows.

By means of the slurry pump 9, coal slurry is pumped out of the supply reservoir 8 and along the duct 11 into the cylinder 12, the duct 13 and the space 67 surrounding the valve needle 65 in the injection valve 6. Any coal slurry supplied in excess of that required to fill these components is fed back along the overflow duct 14 to the reservoir 8.

By means of the diesel oil pump 16, diesel oil is fed along the duct 17 to the high-pressure pump 19.

Injection of coal slurry and ignition oil is accomplished jointly for both substances by the high-pressure pump 19. As the camshaft 44 turns, the cam 53 moves the piston 19′ upwards by way of the ram 55. The high-pressure supply of diesel oil to the ducts 29,26,27,28 begins at the instant the control edge 20 completely covers the upper control aperture 22. The diesel oil at high pressure passes along the duct 28 into the operating cylinder 29 and urges the piston 12′ upwards, as viewed, so that the coal slurry in the cylinder 12, in the duct 13 and in the space 67 in the injection valve 6 is exposed to a pressure high enough to overcome the closing pressure which is exerted on the valve needle 65 by way of the p compression spring 71 and the diesel oil in the pressure chamber 69 (FIG. 4). The valve needle 65 therefore lifts off the seat 64 and allows coal slurry to flow into the spray openings 63, from which the slurry squirts into the combustion chamber. This injection phase lasts until the piston 12′ strikes the stop 29′.

The additional diesel oil supplied by the high-pressure pump 19 passes by way of the non-return valve 34 and ducts 27, 27′ to the accumulator 38, bringing the accumulator 38 to the required pressure. This pressure is determined by means of the regulating valve 60 in the discharge duct 59. As soon as the piston 19′ begins the downward stroke, there is a drop in pressure in the cylinder chamber 18 and hence also in the chamber of the operating cylinder 29 below the disc 30, to the pressure (somewhat higher than the delivery pressure of the slurry pump 9) determined by the diesel oil pump 16. In spite of this pressure difference, the piston 12′ is moved downwards by means of the return spring 31 until the piston 12′ bears on the stop screw 32.

During this downward motion, the cylinder 12, the duct 13 and the space 67 in the injection valve 6 are refilled with primary fuel by way of the duct 11 and suction valve 11'. This next dose therefore corresponds exactly to the quantity of primary fuel to be injected. This injection dose can be varied according to the speed of the reciprocating engine by adjusting the rack 33 and so changing the position of the stop screw 32 relative to the operating cylinder 29.

When the primary fuel is injected into the combustion chamber 3, the combined effect of the diesel oil in the pressure chamber 69 and the compression spring 71 again prevails, so that the valve needle 65 is move into its closed position by way of the plunger 68.

Whereas injection of the primary fuel is on the positive displacement principle, injection of the ignition oil is controlled in dependence on time. The loading piston 40' (FIG. 3) which acts on the valve needle 41 of the injection valve 1 is supplied in the idle condition by way of the fixed throttle 39 with diesel oil at the pressure prevailing in the accumulator 38. Because the piston 40' is larger in diameter than the valve needle 41, therefore, the loading piston 40' holds the needle 41 closed. To lift the needle 41, the closing pressure acting on the piston 40' is relieved, this being effected by way of the control duct 42. When, during the upward stroke of the piston 19', the control edge 21 simultaneously exposes the central and lower control apertures 23 and 23', these two apertures are briefly connected. This connection is then interrupted when the control edge 21' completely covers the lower aperture 23'. During this upward stroke of the piston 19', also, the ducts 45 and 47 are connected continuously to the groove 50 and to the bores 51, 52 in the camshaft 44. During the brief period in which the control apertures 23 and 23' are connected, therefore, diesel oil flows along the control duct 42 to the discharge bore 52, so that for the duration of this brief connection, the pressure on the loading piston 40' is relieved. Consequently, the pressure of the diesel oil in the accumulator 38 prevails, with the result that the valve needle 41 briefly lifts and allows a corresponding jet of ignition oil into the combustion chamber 3. Although the control apertures 23, 23' are also briefly connected during the downward stroke of the piston 19', this has no effect on the injection valve 1, since the groove 50 in the camshaft 44 does not, at that time, communicate with the duct 47. During the downward stroke of the piston 19, therefore, the injection valve 1 remains closed, because there is no pressure relief at the loading piston 40'.

In the injection system described, the relation between the moment of injection for the primary fuel and that for the ignition oil is fixed, since this relation is determined by the control apertures 22, 23 and 23' and the parallel arrangement of the associated control edges 20, 21 and 21'. In addition, the duration of ignition oil injection is constant.

If the internal combustion engine is to be operated using diesel oil as the primary fuel, the three-way valve 10 is pivoted clockwise until the duct 11 is connected to the duct 77 downstream of the diesel oil pump 16, breaking the connection between the duct 11 and slurry pump 9. Diesel oil is then injected as described through the injection valve 6 into the combustion chamber as primary fuel, while the diesel oil injected through the valve 1 assumes the character of a preinjection.

Re-positioning of the three-way valve 10 as described may also occur when the intention is to use diesel oil to flush the duct system of the injection system after operation with coal slurry.

The invention thus provides a fuel injection system wherein hardening of a coal slurry primary fuel is prevented during intervals in operation or after a switch of primary fuel to diesel or heavy oil.

The invention further provides a fuel injection system of relatively simple construction which eliminates the need for an accumulator for primary fuel.

What is claimed is:

1. A fuel injection system for a combustion chamber of a reciprocating internal combustion engine comprising a first injection valve having a plurality of spray openings for injecting a primary fuel into the combustion chamber, a valve seat and a valve needle seated on said valve seat and movable from said valve seat during an injection phase to control flow through said spray openings;

a second injection valve having at least one spray opening for injecting an ignition oil into the combustion chamber and a valve needle for controlling flow through said one spray opening;

an accumulator chamber for receiving ignition oil at an injection pressure at least equal to an injection pressure of the primary fuel, said chamber being in communication with said second injection valve for delivering ignition oil to said one spray opening;

a supply duct communicating with said first injection valve for delivering primary fuel thereto;

a cylinder in said supply duct to receive primary fuel therein; and a hydraulically operated piston in said cylinder for expelling primary fuel from said cylinder into said first injection valve for injection from said plurality of spray openings during said injection phase.

2. A fuel injection system as set forth in claim 1 which further comprises a camshaft driven high pressure piston pump communicating with said piston to deliver pressurized oil thereto for moving said piston to expel primary fuel from said cylinder and communicating with an end of said valve needle of said first injection valve to deliver oil thereto for biasing said valve needle thereof toward said valve seat between said injection phases.

3. A fuel injection system as set forth in claim 2 wherein said first injection valve includes a loading piston coaxial of and abutting said valve needle, said loading piston being disposed between said valve needle and said piston pump and being of a smaller diameter than said valve seat, and a spring biasing said loading piston against said valve needle.

4. A fuel injection system as set forth in claim 3 wherein said first injection valve includes a guide for said valve needle, an axial bore in said loading piston to receive pressurized oil, a blind axial bore in said valve needle in communication with said bore in said loading piston, a transverse bore connected to said blind bore and an annular groove in said valve needle communicating with said transverse bore and disposed within said guide.

5. A fuel injection system as set forth in claim 2 which further comprises a second duct communicating said piston pump with said accumulator chamber to deliver pressurized oil thereto, a non-return valve in said second duct to prevent a backflow to said piston pump and a third duct connected in parallel with said second duct to deliver pressurized oil to an end of said valve needle of said second injection valve to bias said valve needle into a closed position relative to said one spray opening between said injection phases of said second injection valve.

6. A fuel injection system as set forth in claim 2 where said piston pump includes an oil chamber, a suction valve for drawing oil into said chamber, a piston having an oblique edge facing said oil chamber, an overflow aperture within a stroke of said pump piston and cooperating with said edge to control the start of delivery for said piston pump, a pinion on said pump piston and a slidable rack for rotating said pump piston within said oil chamber to vary the time at which said injection phase begins.

7. A fuel injection system as set forth in claim 2 which further comprises a second duct communicating said piston pump with said accumulator chamber to deliver pressurized oil thereto, a non-return valve in said second duct to prevent a backflow to said piston pump and a third duct connected in parallel with said second duct to deliver pressurized oil to an end of said valve needle of said second injection valve to bias said valve needle into a closed position relative to said one spray opening between said injection phases of said first injection valve.

8. A fuel injection system as set forth in claim 7 wherein said piston pump further comprises a pair of control apertures and a control groove in said pump piston for communicating said pair of control apertures during said injection phase, and which further comprises a control duct communicating said third duct with one of said pair of control apertures to relieve pressure on said valve needle of said second injection valve and a cam shaft driven control device connected to the other of said pair of control apertures to prevent pressure relief in said third duct during a return stroke of said pump piston.

9. A device as set forth in claim 8 wherein said control device includes a component for fixed mounting on a cam shaft having a groove in a part peripheral surface thereof and a duct in said component in communication with said other control aperture and in communication with said groove during said return stroke of said pump piston.

10. A device as set forth in claim 2 which further includes a spring biasing said hydraulically operated piston into an initial position between injection phases.

11. A device as set forth in claim 2 which further comprises means for adjusting the stroke of said hydraulically operated piston in dependence on the speed of the reciprocating engine.

12. A device as set forth in claim 11 which further comprises an overflow duct connected to said accumulator chamber and a regulating valve in said overflow duct to determine the pressure of oil in said accumulator chamber, said regulating valve being adjustable in dependence on an adjustment in the stroke of said hydraulically operated piston.

13. A device as set forth in claim 2 which further comprises a diesel oil pump upstream of said piston pump for delivering diesel oil to said piston pump and a three-way valve in said supply duct for selectively connecting said supply duct to said diesel oil pump for delivery of diesel oil to said first injection valve.

14. A fuel injection system for a combustion chamber of a reciprocating internal combustion engine comprising
a first injection valve having a plurality of spray openings for injecting a primary fuel containing a suspension of solid fuel particles into the combustion chamber;
a second injection valve having at least one spray opening for injecting diesel oil into the combustion chamber for ignition of the primary fuel;
an accumulator chamber for receiving ignition oil at an injection pressure at least equal to an injection pressure of the primary fuel, said chamber being in communication with said second injection valve for delivering ignition oil to said one spray opening;
a supply duct communicating with said first injection valve for delivering primary fuel thereto;
a cylinder in said supply duct to receiving primary fuel therein; and
a hydraulically operated piston in said cylinder for expelling primary fuel from said cylinder into said first injection valve for injection from said plurality of spray openings during said injection phase.

15. A fuel injection system as set forth in claim 14 wherein said first injection valve includes a valve seat upstream of said spray openings and a valve needle seated on said valve seat and which further comprises a piston pump communicating with said piston to deliver pressurized diesel oil to said piston for moving said piston to expel primary fuel from said cylinder to said first injection valve and communicating with an end of said valve needle to deliver pressurized diesel oil thereto for biasing said valve needle toward said valve seat and against the pressure of the primary fuel between said injection phases.

16. A fuel injection system as set forth in claim 15 wherein said first injection valve includes a loading piston coaxial of and abutting said valve needle, said loading piston being disposed between said valve needle and said piston pump and being of a smaller diameter than said valve seat, and a spring biasing said loading piston against said valve needle.

17. A fuel injection system a set forth in claim 15 which further comprises a diesel oil pump upstream of said piston pump for delivering diesel oil to said piston pump and a three-way valve in said supply duct for selectively connecting said supply duct to said diesel oil pump for delivery of diesel oil to said first injection valve.

18. A fuel injection system as set forth in claim 15 wherein said second injection valve includes a valve needle for controlling flow through said one spray opening and which further comprises a second duct communicating said piston pump with said accumulator chamber to deliver pressurized oil thereto, a non-return valve in said second duct to prevent a backflow to said piston pump and a third duct connected in parallel with said second duct to deliver pressurized oil to an end of said valve needle of said second injection valve to bias said valve needle into a closed position relative to said one spray opening between said injection phases of said second injection valve.

19. A fuel injection system as set forth in claim 14 which further comprises means for adjusting the stroke of said piston in dependence on the speed of the reciprocating engine, an overflow duct connected to said accumulator and a regulating valve in said overflow duct to determine the pressure of oil in said accumulator, said regulating valve being adjustable in dependence on an adjustment in the stroke of said hydraulically operated piston.

20. A fuel injection system for a combustion chamber of a reciprocating internal combustion engine comprising
- a supply reservoir for a primary fuel containing a suspension of solid fuel particles;
- a first injection valve having spray openings for injecting the primary fuel into the combustion chamber during an injection phase, a valve seat upstream of said openings and a valve needle seated on said seat;
- a supply duct communicating said reservoir with said injection valve to deliver primary fuel thereto;
- a cylinder in said supply duct for receiving primary fuel;
- a piston slidably mounted in said cylinder for pressurizing the primary fuel in said cylinder and in said valve during an injection phase;
- a supply reservoir for diesel oil;
- a second injection valve having at least one spray aperture for injecting diesel oil into the combustion chamber during said injection phase for ignition of the primary fuel therein, a valve seat and a valve needle seated on said seat;
- an accumulator chamber for receiving diesel oil from said oil reservoir and communicating with said second injection valve for delivering diesel oil to said one spray aperture;
- a piston pump having a chamber communicating with said oil reservoir to receive diesel oil therefrom and a piston for pressurizing the diesel oil in said chamber;
- a first duct connecting said piston pump chamber to said first injection valve to bias said valve needle therein towards said seat therein;
- a second duct connecting said piston pump chamber to said accumulator chamber to pressurize the oil therein; and
- a third duct connected in parallel to said second duct and communicating with said second valve to bias said valve needle therein towards said valve seat therein.

21. A fuel injection system a set forth in claim 20 which further comprises a diesel oil pump upstream of said piston pump for delivering diesel oil to said piston pump and a three-way valve in said supply duct for selectively connecting said supply duct to said diesel oil pump for delivery of diesel oil to said first injection valve.

* * * * *